United States Patent
Thompson et al.

(10) Patent No.: US 10,895,128 B2
(45) Date of Patent: Jan. 19, 2021

(54) TAPER LOCK BYPASS PLUNGER

(71) Applicant: PCS FERGUSON, INC., Frederick, CO (US)

(72) Inventors: Jason Thompson, Roggen, CO (US); Paul Roberts, Frederick, CO (US); Shannon Freeman, Frederick, CO (US); Kolten P. Jelden, Greeley, CO (US)

(73) Assignee: PCS Ferguson, Inc.

( * ) Notice: Subject to any disclaimer, the term of this patent is extended or adjusted under 35 U.S.C. 154(b) by 0 days.

(21) Appl. No.: 16/419,457

(22) Filed: May 22, 2019

(65) Prior Publication Data

US 2020/0370396 A1 Nov. 26, 2020

(51) Int. Cl.
*E21B 34/12* (2006.01)
*F16K 1/14* (2006.01)
*F16K 1/38* (2006.01)

(52) U.S. Cl.
CPC .......... *E21B 34/12* (2013.01); *F16K 1/14* (2013.01); *F16K 1/38* (2013.01); *E21B 2200/01* (2020.05); *E21B 2200/04* (2020.05)

(58) Field of Classification Search
CPC ........ E21B 34/12; E21B 2200/04; F16K 1/14; F16K 1/38
See application file for complete search history.

(56) References Cited

U.S. PATENT DOCUMENTS

| | | |
|---|---|---|
| 2,001,012 A | 5/1935 | Burgher |
| 2,661,024 A | 12/1953 | Knox |
| 2,714,855 A | 8/1955 | Brown |
| 3,181,470 A | 5/1965 | Clingman |
| 3,209,872 A | 10/1965 | Moyer et al. |
| 3,329,211 A | 7/1967 | Roach |
| 4,502,843 A | 3/1985 | Martin |
| 5,333,684 A | 8/1994 | Walter et al. |
| 5,868,554 A | 2/1999 | Giacomino |
| 6,148,923 A | 11/2000 | Casey |
| 6,209,637 B1 | 4/2001 | Wells |
| 6,241,028 B1 | 6/2001 | Bijleveld et al. |
| 6,273,690 B1 | 8/2001 | Fischer, Jr. et al. |
| 6,467,541 B1 | 10/2002 | Wells |
| 6,591,737 B2 | 7/2003 | Giacomino |
| 6,669,449 B2 | 12/2003 | Giacomino |
| 6,705,404 B2 | 3/2004 | Bosley |
| 6,719,060 B1 | 4/2004 | Wells |
| 6,746,213 B2 | 6/2004 | Giacomino |
| 6,883,612 B2 | 4/2005 | Ferguson |
| 6,907,926 B2 | 6/2005 | Bosley |
| 6,935,427 B1 | 8/2005 | Billingsley |
| 6,945,762 B2 | 9/2005 | Williams |
| 7,290,602 B2 | 11/2007 | Victor |
| 7,314,080 B2 | 1/2008 | Giacomino |
| 7,328,748 B2 | 2/2008 | Giacomino |

(Continued)

*Primary Examiner* — David Carroll
(74) *Attorney, Agent, or Firm* — Snell & Wilmer L.L.P.; Russell T. Manning

(57) ABSTRACT

The bypass plungers are disclosed that are configured to provide a mechanical lock between a valve face of plunger and a the valve element of the plunger. More specifically, the valve face and the valve seat are correspondingly configured to allow the valve face to wedge into the interior of the valve seat such that the valve head becomes stuck within the interior of the valve seat.

10 Claims, 12 Drawing Sheets

(56) References Cited

U.S. PATENT DOCUMENTS

| | | | |
|---|---|---|---|
| 7,383,878 B1 | 6/2008 | Victor | |
| 7,438,125 B2 | 10/2008 | Victor | |
| 7,513,301 B2 | 4/2009 | Victor | |
| 7,523,783 B2 | 4/2009 | Victor | |
| 7,475,731 B2 | 6/2009 | Victor | |
| 7,597,143 B2 | 10/2009 | Giacomino | |
| 7,690,425 B2 | 4/2010 | Giacomino | |
| 7,878,251 B2 | 2/2011 | Giacomino | |
| 8,181,706 B2 | 5/2012 | Tanton | |
| 8,485,263 B2 | 7/2013 | Lembcke | |
| 9,890,621 B2 * | 2/2018 | Bishop | E21B 43/121 |
| 2003/0141051 A1 | 7/2003 | Abbott et al. | |
| 2003/0155129 A1 * | 8/2003 | Gray | E21B 43/121 166/370 |
| 2003/0215337 A1 | 11/2003 | Lee | |
| 2004/0129428 A1 | 7/2004 | Kelley | |
| 2005/0241819 A1 * | 11/2005 | Victor | E21B 43/127 166/68 |
| 2010/0252280 A1 * | 10/2010 | Swor | E21B 43/14 166/386 |
| 2012/0132437 A1 | 5/2012 | Gong et al. | |
| 2016/0097265 A1 * | 4/2016 | Bishop | E21B 43/121 166/372 |
| 2017/0107802 A1 * | 4/2017 | Kuykendall | E21B 34/14 |
| 2019/0264512 A1 * | 8/2019 | Stair | E21B 21/10 |
| 2020/0088303 A1 * | 3/2020 | Boyd | E21B 43/121 |

* cited by examiner

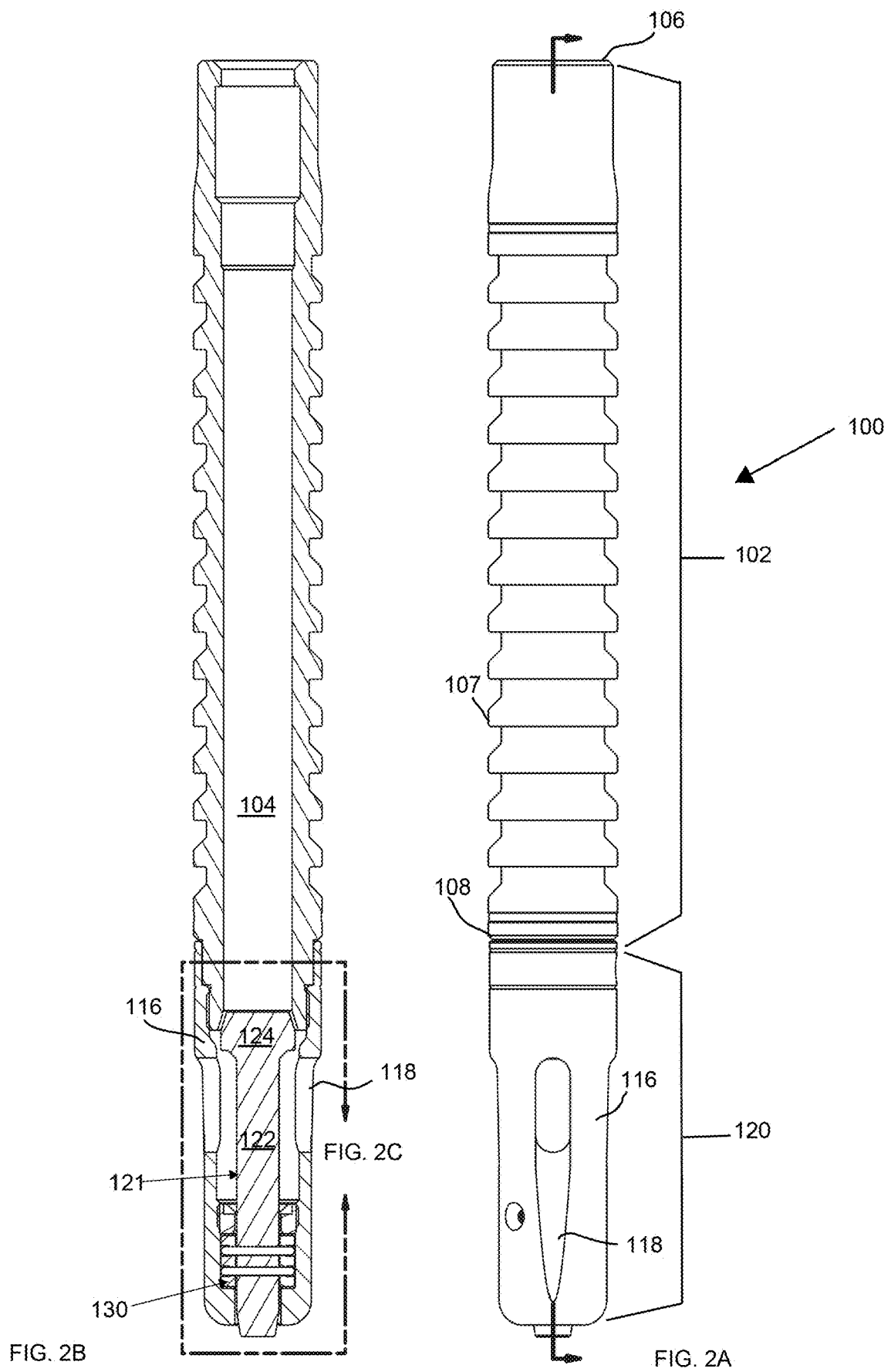

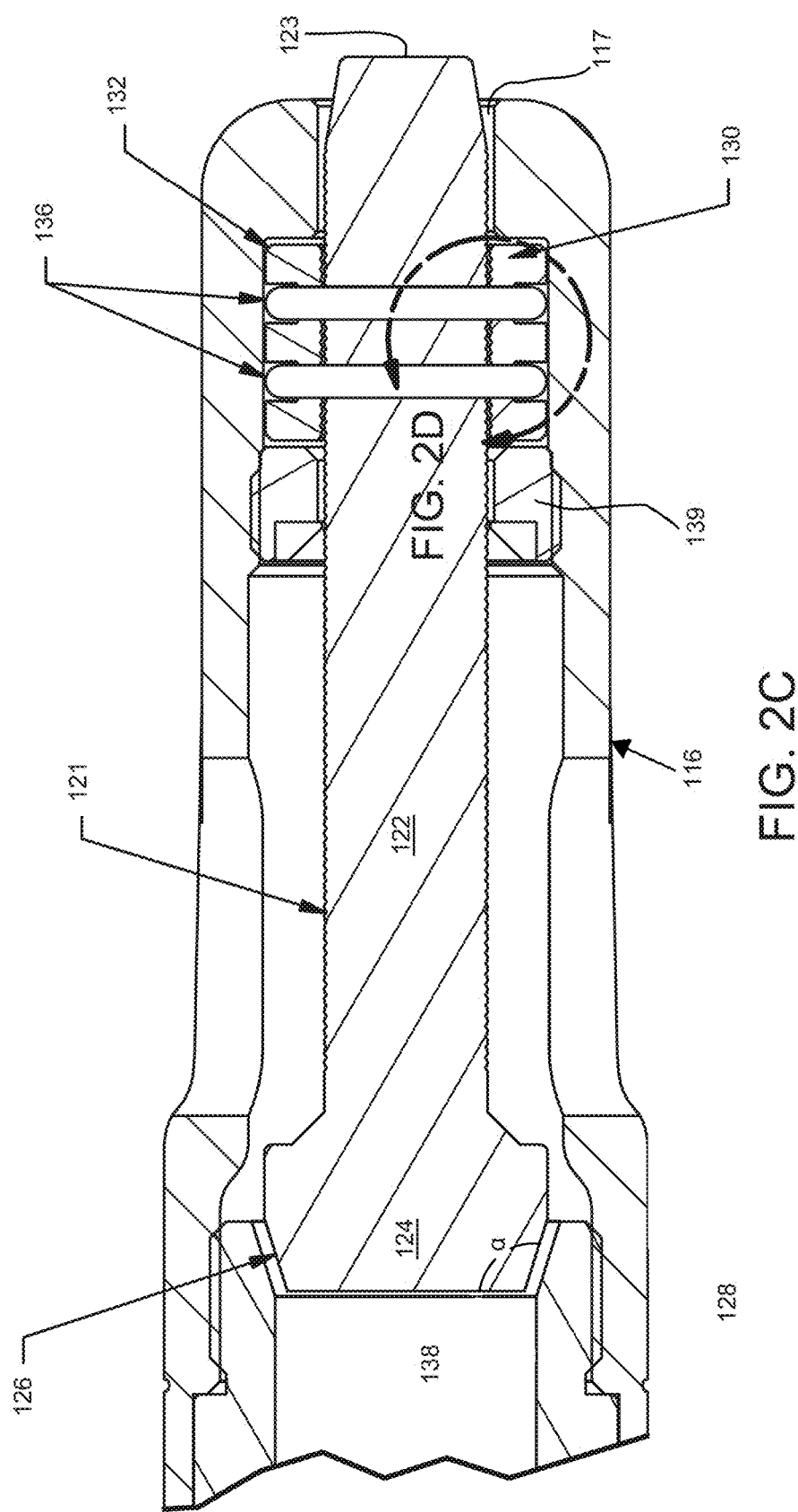

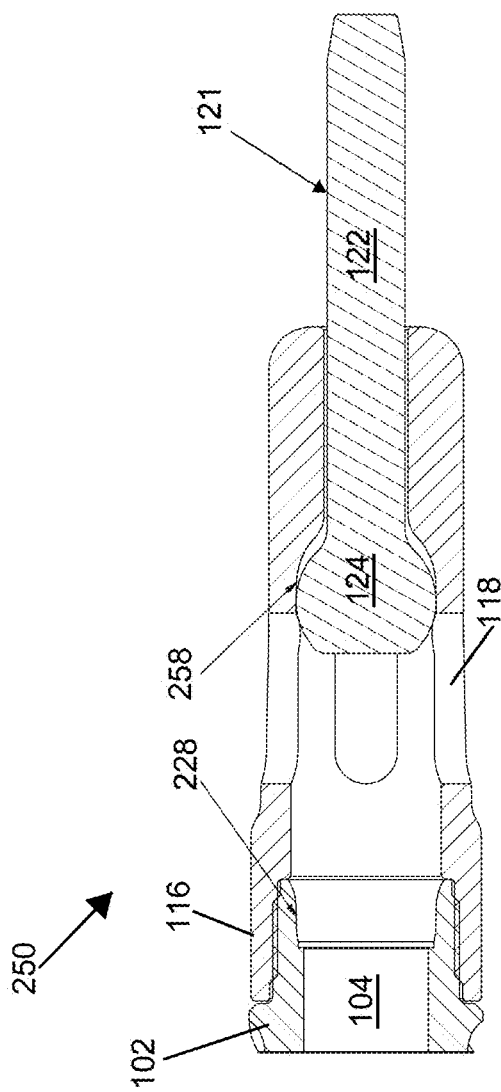
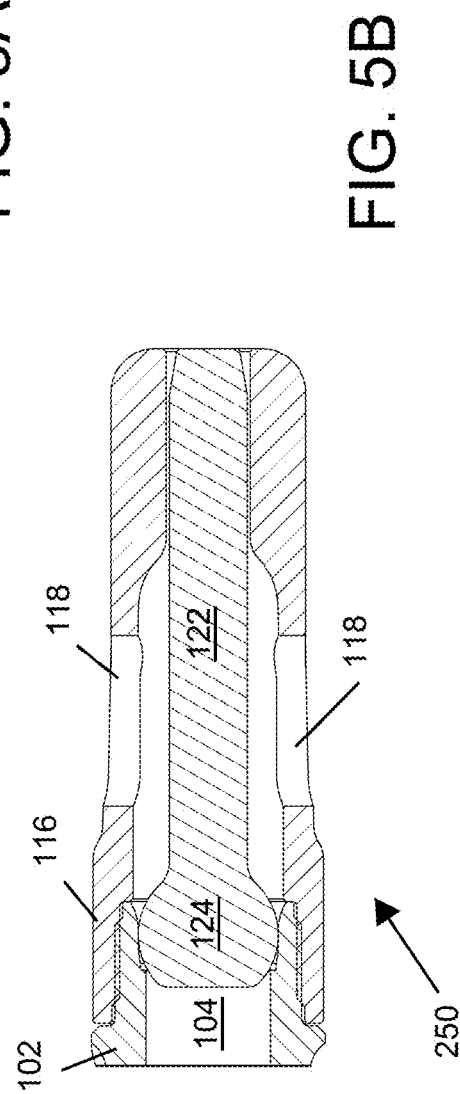
FIG. 5A
FIG. 5B

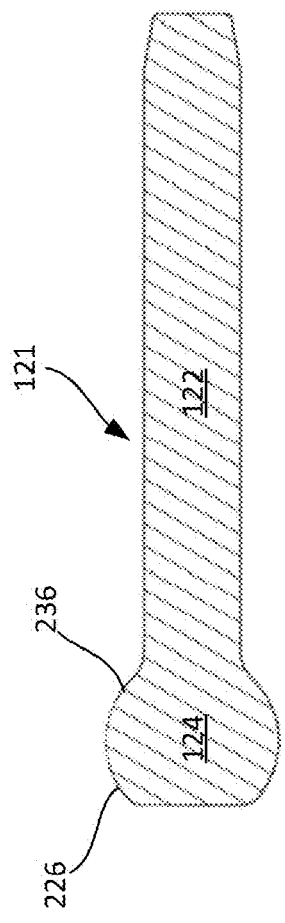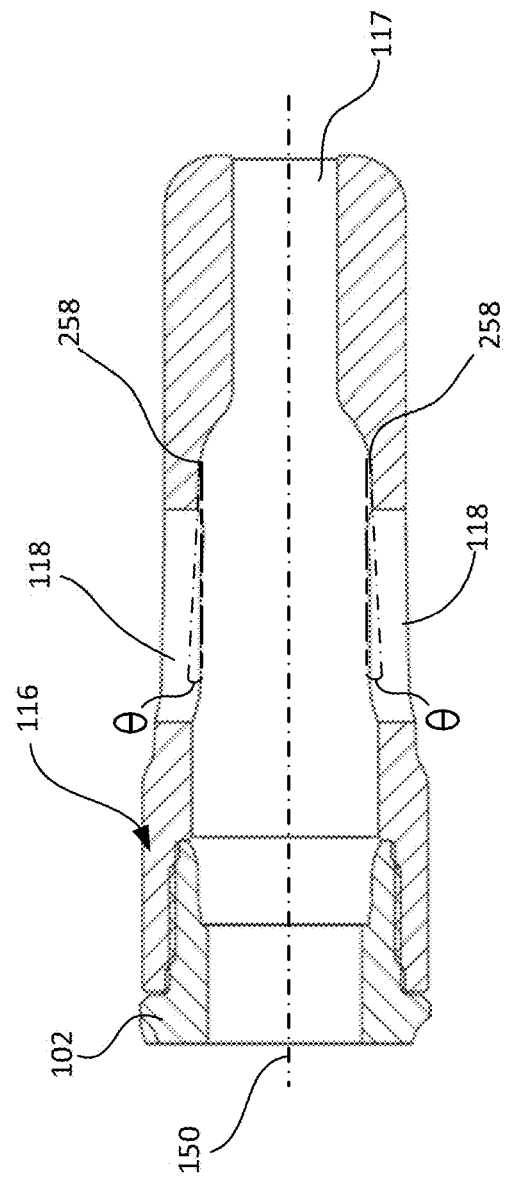

TAPER LOCK BYPASS PLUNGER

FIELD

The present disclosure relates to an artificial lift plunger for the lifting of formation liquids in a hydrocarbon well. More specifically the plunger is a bypass plunger having a bypass element or valve that locks in a closed position to provide an improved seal across the plunger.

BACKGROUND

A plunger lift is an apparatus that is used to increase the productivity of oil and gas wells experiencing liquid loading. In the early stages of a well's life, liquid loading is usually not a problem. When gas flow rates of the well are high, the well liquids are carried out of the well tubing by the high velocity gas. As the well declines, a critical velocity is reached below which the heavier liquids do not make it to the surface and start to fall back to the bottom exerting back pressure on the formation, thus loading the well. A plunger lift system is an artificial lift arrangement utilized to unload wells. In operation, the plunger travels to the bottom of the production tubing of a well where the loading fluid is picked up by the plunger and is brought to the surface, thereby removing liquids from the production tubing.

A plunger lift system utilizing a piston or solid plunger typically works by cycling a well open and closed. While the well is closed, the solid plunger falls to the bottom of the well passing through fluids in the production tubing. While the well is open, gas accumulating below the plunger pushes the plunger and liquid above the plunger in the production tubing to the surface. This removal of the liquid from the tubing bore allows for the production of liquids (e.g., oil) and/or allows additional volumes of gas to flow from a producing well. A plunger lift requires sufficient gas presence within the well to be functional in driving the system.

Bypass plungers allow for unloading a well without interrupting production. Typically, bypass plungers are configured to freely descend in the production tubing while fluids are passing upward through the production tubing. A bypass plunger typically includes a valve (e.g., bypass element or valve element) that, when open, permits well fluids to pass through the bypass valve and passage(s) in the plunger body as the plunger descends through the production tubing. The bypass valve provides a shut off feature when the plunger reaches the bottom of the well. That is, upon reaching the bottom of the well, the bypass valve closes thereby blocking the passage(s) that allow fluids to flow through the plunger. This blocks upward flow of gasses through the bypass plunger effectively converting it into a piston-type plunger. Accordingly, gas accumulating below the closed bypass plunger pushes the plunger and liquid above the plunger in the production tubing to the surface. At the surface, the valve is re-opened permitting the bypass plunger to descend back in to the well.

SUMMARY

Disclosed herein are bypass plungers having generally cylindrical body with a flow path therethrough. In an arrangement, the cylindrical body has an axial flow path or internal bore that extends between a top end of the body and a bottom end of the body. Variations are possible. In any arrangement, this internal bore or flow path provides a fluid path through the cylindrical body. A valve face of a valve element is configured to engage and lock within a valve seat in the flow path. When the valve face engages with the valve seat, the flow path is blocked permitting the plunger to ascend in production tubing. When the valve element disengages from the valve seat, the flow path opens and the plunger may descend through production tubing.

The bypass plungers are configured to provide a mechanical lock between the valve face of the valve element and a mating valve seat. More specifically, the valve face and the valve seat are correspondingly configured to allow the valve face to wedge into the interior of the valve seat such that the valve head becomes stuck within the interior of the valve seat. Typically, an outside diameter or other portion of the valve element fits into a valve seat which has self-holding taper. That is, these elements are configured to provide a self-holding taper, where the valve element and the valve seat wedge together and bind to each other to the extent that these elements must be driven apart. The taper angle of the generally annular valve seat is typically between about one-tenth a degree (0.1°) and about fifteen degrees (15.0°) relative to a centerline axis of the valve seat. More preferably, the valve seat surface is tapered between about one-tenth a degree (0.1°) and about ten degrees (10.0°). Yet more preferably, the valve seat surface is tapered between about one-tenth a degree (0.1°) and about five degrees (5.0°).

When the bypass plunger having a locking/tapered interface reaches the bottom of a well and strikes a seating nipple/tubing stop or other structure, the valve face is driven/wedged into the valve seat mechanically locking the valve seat within the valve face coupling these elements. This seals the interface between these elements preventing the passage of gasses across this interface.

In a further arrangement, the bypass plunger utilizes a double locking valve element. In such an arrangement a first valve face of the valve element locks in a first valve seat to close the flow path through the flow path of the plunger. A second valve face of the valve element locks in a second valve seat (e.g., in a valve cage) to lock the valve element in an open position to permit fluid to flow through the flow path.

BRIEF DESCRIPTION OF THE DRAWINGS

FIGS. 2A and 2B illustrate a bypass plunger.

FIG. 2C illustrates the valve assembly of the plunger of FIGS. 2A and 2B.

FIGS. 5A and 5B illustrate a lower end of a bypass plunger in open and closed configurations.

FIG. 5C illustrates a push rod of the bypass plunger of FIGS. 5A and 5B.

FIG. 5D illustrates a valve cage of the bypass plunger of FIGS. 5A and 5B.

DETAILED DESCRIPTION

Reference will now be made to the accompanying drawings, which at least assist in illustrating the various pertinent features of the presented inventions. The following description is presented for purposes of illustration and description and is not intended to limit the inventions to the forms disclosed herein. Consequently, variations and modifications commensurate with the following teachings, and skill and knowledge of the relevant art, are within the scope of the presented inventions. The embodiments described herein are further intended to explain the best modes known of practicing the inventions and to enable others skilled in the art to utilize the inventions in such, or other embodiments and with various modifications required by the particular application(s) or use(s) of the presented inventions.

Figure 1:
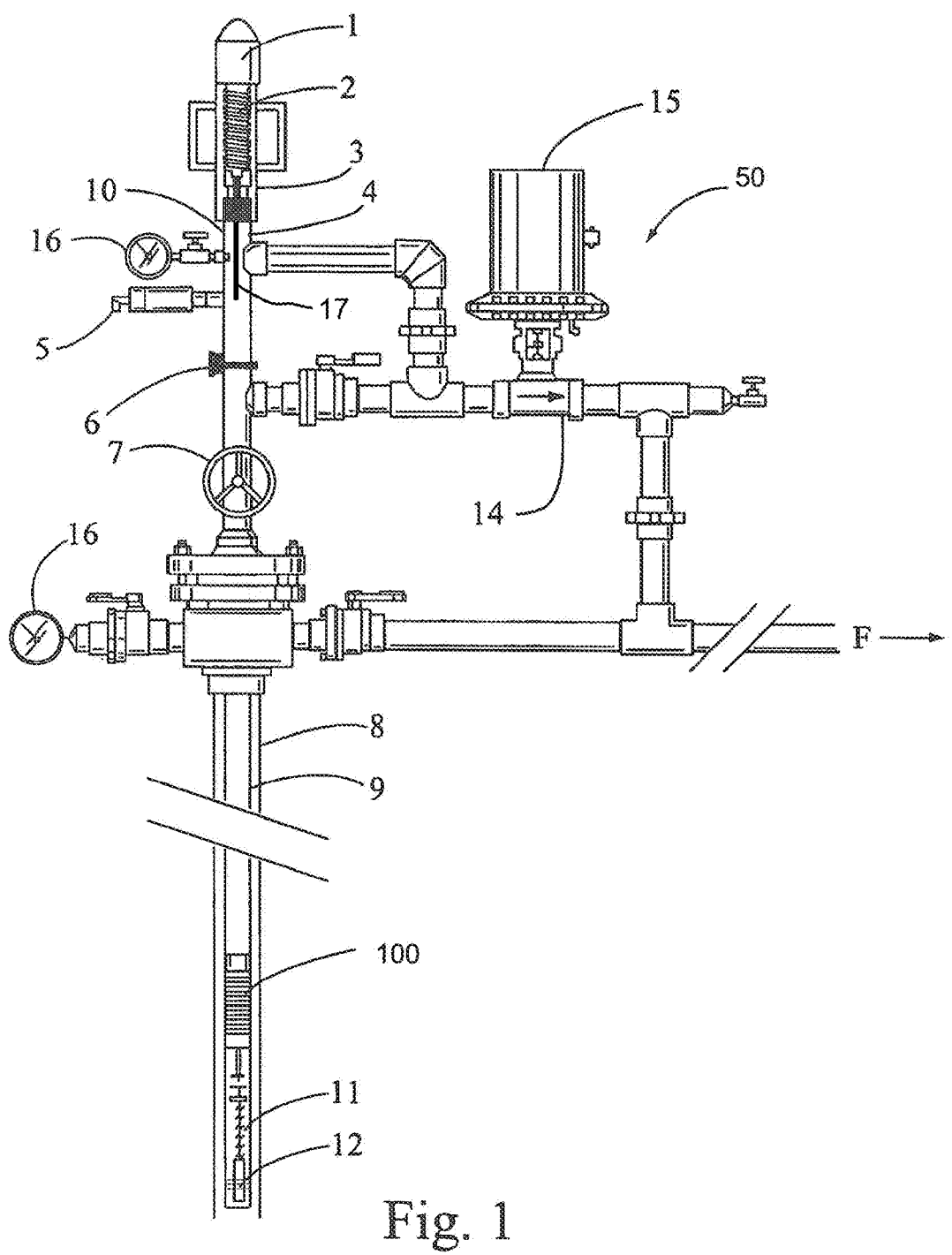
FIG. 1 illustrates a well head and production well.

A typical installation plunger lift system 50 can be seen in FIG. 1. The system includes what is termed a lubricator assembly 10 disposed on the surface above a well bore including casing 8 and production tubing 9. The lubricator assembly 10 is operative to receive a plunger 100 from the production tubing 9 and release the plunger 100 into the production tubing 9 to remove fluids (e.g., liquids) from the well. Fluid accumulating above of the plunger 100 at the bottom of the well may be carried to the top of the well by the plunger 100. Specifically, after passing through the liquids at the bottom of the well, gasses accumulate under the plunger lifting the plunger and the fluid accumulated above the plunger to the surface. The plunger 100 can represent the plunger of the presented inventions or other prior art plungers. In any arrangement, the lubricator assembly 10 controls the cycling of the plunger into and out of the well. The lubricator assembly 10 includes a cap 1, integral top bumper spring 2, striking pad 3, and a receiving tube 4, which is aligned with the production tubing. When utilized with a bypass plunger, the lubricator may further include a rod 17 that may extend through a plunger received by the lubricator to open a bypass valve or valve element of the plunger.

In some embodiments, the lubricator assembly 10 contains a plunger auto catching device 5 and/or a plunger sensing device 6. The sensing device 6 sends a signal to surface controller 15 upon plunger 100 arrival at the top of the well and/or dispatch of the plunger 100 into the well. When utilized, the output of the sensing device 6 may be used as a programming input to achieve the desired well production, flow times and wellhead operating pressures. A master valve 7 allows for opening and closing the well. Typically, the master valve 7 has a full bore opening equal to the production tubing 9 size to allow passage of the plunger 100 there through. The bottom of the well is typically equipped with a seating nipple/tubing stop 12. A spring standing valve/bottom hole bumper assembly 11 may also be located near the tubing bottom. The bumper spring is located above the standing valve and can be manufactured as an integral part of the standing valve or as a separate component of the plunger system.

Surface control equipment usually consists of motor valve (s) 14, sensors 6, pressure recorders 16, etc., and an electronic controller 15 which opens and closes the well at the surface. Well flow 'F' proceeds downstream when surface controller 15 opens well head flow valves. Controllers operate based on time, or pressure, to open or close the surface valves based on operator-determined requirements for production. Alternatively, controllers may fully automate the production process.

When motor valve 14 opens the well to the sales line (not shown) or to atmosphere, the volume of gas stored in the casing and the formation during the shut-in time typically pushes both the fluid load and the plunger 100 up to the surface. Forces which exert a downward pressure on a plunger can comprise the combined weight of the fluid above the plunger, the plunger itself as well as the operating pressure of the sales line together with atmospheric pressure. Forces which exert an upward pressure on a plunger can comprise the pressure exerted by the gas in the casing. Frictional forces can also affect a plunger's movement. For example, once a plunger begins moving to the surface, friction between the tubing and the fluid load opposes plunger movement. Friction between the gas and tubing also slows an expansion of the gas. However, in a plunger installation, generally it is only the pressure and volume of gas in the tubing and/or casing annulus which serves as the motive force for bringing the fluid load and plunger to the surface. Once received at the surface, the plunger may be immediately dispatched back into the well or held until a subsequent plunger cycle time.

FIGS. 2A and 2B illustrate side and cross-sectional side views of a bypass plunger 100. In the present embodiment, the plunger includes three primary components a sleeve or body 102, a valve assembly 120 and a clutch assembly 130. In the illustrated embodiment, the valve assembly 120 is in a closed position. The upper end of the bypass plunger 100 is defined by the generally cylindrical sleeve or plunger body 102 having an hollow interior defining a fluid passage or flow path 104 through which production fluids may pass when the valve assembly is open (e.g., when the plunger descends into a well). The hollow interior or fluid flow path 104 extends between a top end 106 and a bottom end 108 of the plunger body 102. In the illustrated embodiment, the exterior sidewall of the plunger body 102 includes a series of solid rings 107. However, it will be appreciated that various other sidewall geometries are possible (pads, brush, etc.) and within the scope of the present disclosure. By way of example, various sidewall geometries are illustrated in U.S. Pat. No. 7,438,125, the entirety of which is incorporated herein by reference.

As shown, a valve cage 116 is disposed at the bottom end 108 of the plunger body 102. In an embodiment, an upper internal bore of the valve cage includes internal threads (not shown) that mate with external threads (not shown) formed on a lower outer surface of the plunger body 102. In such an embodiment, the valve cage is threadedly attached to the plunger body. However, other connections (e.g., crimping, welding, etc.) are possible. The flow path 104 through the plunger body 102 opens into a hollow interior of the valve cage 116 to enable the flow of fluid through the plunger 100 when the valve 120 is open and the plunger is descending through production tubing. The valve cage 116 includes a plurality of openings 118 in its sidewall to permit the passage of fluids through the bypass plunger 100 when the valve assembly 120 is open (not shown). In the illustrated embodiment, the openings 118 are generally elongated and disposed parallel with the longitudinal axis of the plunger as well as evenly disposed around the circumference of the valve cage 116. However, the configuration of the openings may vary.

The valve assembly 120 is defined by a push rod 121 that is retained within the valve cage 116. The push rod 121 includes a valve stem 122 and a valve head 124 (e.g., valve element) disposed at the upper end of the valve stem 122. The valve head 124 includes an angled valve face 126 (See also FIG. 2C) that mates with an angled valve seat 128 formed within the lower end of the plunger body 102 or, alternatively, in an upper portion of the valve cage 116. The valve push rod 121 is configured to move within the valve cage 116 between the closed position where the valve face 126 engages the valve seat 128 (FIGS. 2B and 2C) and an open position (See, e.g., FIG. 3B) where the valve head 124 is positioned below the valve seat 128 to provide a flow path through the plunger 100.

When assembled, the pushrod 121 is disposed within an interior of the valve cage 116. The valve stem 122 extends from the valve head 124 through an interior of the valve cage 116 and through an aperture 117 in the bottom end of the valve cage 116. See FIG. 2C. When the push rod 121 is open to permit fluid flow through the valve cage 116 and plunger body 102, a lower end 123 of the stem 122 is disposed through the bottom of the valve cage 116. See e.g., FIG. 3B. In such a configuration, the plunger 100 may descend though production tubing until the lower end 123 of the stem 122 engages the seating nipple/tubing stop or other structure at the bottom of the well. Contacting the seating nipple or other structure at the bottom of the well forces the push rod 121 upward in the cage 116 until the valve face 126 contacts the valve seat 128. See FIG. 2B. This closes the valve assembly 120 preventing fluid flow path through/across the plunger 100. At this time, gas accumulates below the closed bypass plunger pushing the plunger and liquids above the plunger to the surface. At the surface, the valve 120 is re-opened by a rod in the well head lubricator permitting the bypass plunger to descend back in to the well.

To allow the plunger 100 to descend to the bottom of the well, it is necessary that the valve assembly 120 remain open during plunger descent. That is, if the valve pushrod 121 closes during descent, the plunger typically will not reach the bottom of the well before it starts to ascend in the well. In such a situation, the plunger fails to unload the well. To maintain the valve pushrod 121 in the open position, the plunger 100 utilizes a clutch assembly 130. Broadly, the clutch assembly 130 is configured to engage an outside surface of the valve stem 122 when the pushrod 121 is open to prevent the push rod 121 from moving to a closed position prior to contacting the seating nipple or other structure at the bottom of the well.

Figure 2D:
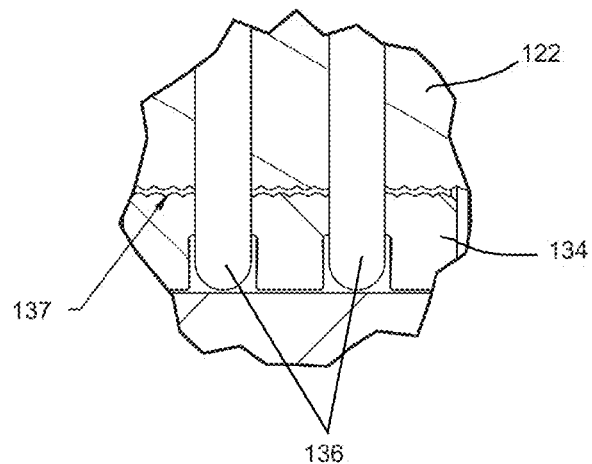
FIGS. 2D and 2E illustrate a clutch assembly of the plunger of FIGS. 2A and 2B.
Figure 2E:
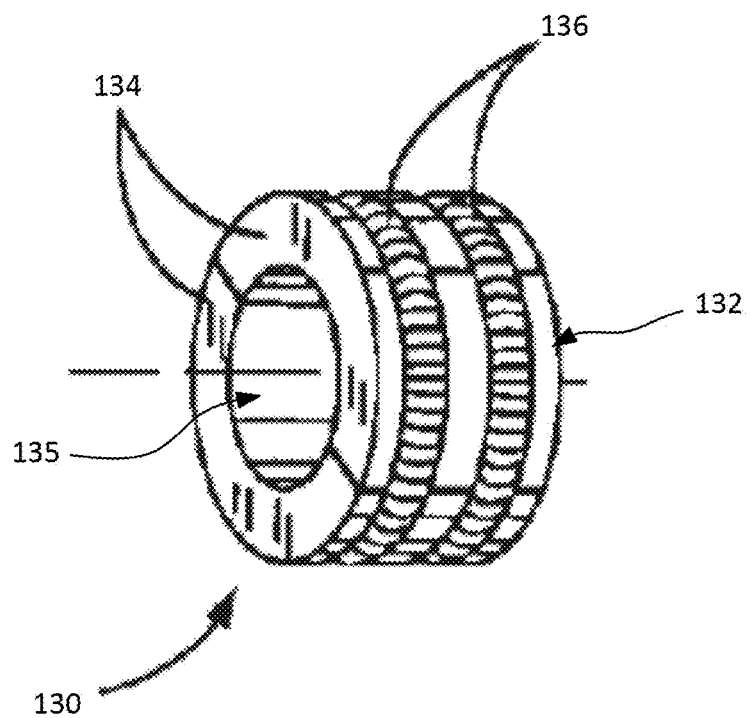

As best illustrated in FIGS. 2D and 2E, the clutch assembly 130 includes a split bobbin 132 formed of first and second semi-cylindrical halves 134. The first and second semi cylindrical halves 134 each include U-shaped axial channels between their top and bottom ends. When assembled, the U-shaped channels collectively form an axial bore 135 through which the valve stem 122 passes. In the illustrated embodiment, first and second garter springs 136 extend around the outer surfaces of the bobbin halves 134 in circumferential channels. The springs 136 hold the semi cylindrical halves 134 together when the clutch assembly 130 is installed in the valve cage 116 and about the valve stem 122 of the bypass plunger 10. The garters may be coil springs or other resilient material formed in a ring. The garter springs 136 apply a compressive force to the bobbin halves 134 which results in the split bobbin gripping the valve stem 122. Various internal nuts 139 and threads (See FIG. 2C) in conjunction with a bore defined within a lower portion of the cage may be utilized to position and hold the clutch within the valve cage 116. The bobbin halves are typically formed of a polymeric material.

FIGS. 2C and 2D illustrate the surface profile of the valve stem 122 and the surface profile of the clutch bobbin 134. The surface profiles define the respective outside surface of the valve stem 122 and the inside surface of the bore 135 of the split bobbin 132. The illustrated surface profiles each form a series of alternating annular ridges and grooves 137. The ridges and grooves 137 provide, in conjunction with compression from the garter springs, resistance (e.g., grabbing friction) to the valve stem 122 sliding within the clutch bobbin 134 as the push rod 121 is opened or closed. Stated otherwise, the grabbing friction provided by the mating surface profiles enable the clutch 130 to retain the valve stem 122 in an open position during descent of the bypass plunger 100.

The utilization of the clutch mechanism 130 and the valve stem 122, which typically both have mating surface profiles to provide a gripping friction between these elements, provides an effective mechanism for holding the valve pushrod 121 open during plunger descent. However, the clutch mechanism 130 can be problematic when closing the valve. Specifically, after contacting the seating nipple/tubing stop or other structure at the bottom of the well, the plunger can slightly rebound above the nipple/tubing stop. This rebounding can allow the valve push rod 121 to also rebound after initial contact. That is, upon initial impact, the push rod 121 may close such that the valve face 126 contacts a valve seat 128. While the plunger rebounds, the pressure on the push rod is released such that the push rod may also slightly rebound such allowing the valve face 126 to slightly open relative to the valve seat 128. This results in a gap 138 between the valve face 126 and the valve seat 128. See FIG. 2C. When a clutch assembly 130 is present, the clutch assembly may grip the valve stem 122 during plunger rebound maintaining the open gap 138. Alternatively, the ridges and valleys of the bobbin and valve stem may mate slightly offset when the valve push rod closes such that the push rod moves back to align the ridges and valleys. Either instance may result in the valve assembly remaining partially open such that the gap 138 exists between the valve face 126 and the valve seat 128. The open gap permits gasses to flow through the plunger 100 when the valve assembly is supposed to be closed. This can result in decreased lift and/or slower cycle times.

To alleviate the potential for partial closure of the valve assembly, the present disclosure is directed to plungers that provide a mechanical lock between a valve face and a mating valve seat. More specifically, the valve face and the valve seat are correspondingly configured to allow the valve face to wedge into the interior of the valve seat such that the valve head becomes stuck within the interior of the valve seat. The arrangement is similar to a machine taper for securing cutting tools or toolholders in the spindle of a machine tool or power tool. In a machine taper, a male member (e.g., valve head) of conical form (e.g., with a tapered face) fits into a female socket (e.g., valve seat) which has a taper of a near equal angle as the male member.

Machine tapers can generally be grouped into self-holding and self-releasing classes. With self-holding machine tapers, the male and female elements wedge together and bind to each other to the extent that these elements must be driven apart. With self-releasing tapers, the male element will not stick within the female element. The presented bypass plungers utilize valve faces and valve seats that incorporate a self-holding taper concept between a valve face and a valve seat. Morse tapers and Jacobs tapers are examples of self-holding varieties of machine tapers. However, it will be appreciated that variation may exist between the presented locking tapered interface and machine tapers utilized for securing cutting tools in the spindle of a machine tool. No limitation should be inferred by the use of the term machine taper. When a bypass plunger having a locking tapered-interface reaches the bottom of a well and strikes a seating nipple/tubing stop or other structure, the valve face is driven/wedged into the valve seat mechanically locking the valve seat within the valve face coupling these elements. This seals the interface between these elements preventing the passage of gasses across this interface. Further, these elements remain locked until they arrive at the surface (e.g., in the lubricator 10; See FIG. 1) where they are mechanically disengaged by the push rod 17 within the lubricator.

Figures 3A, 3B:
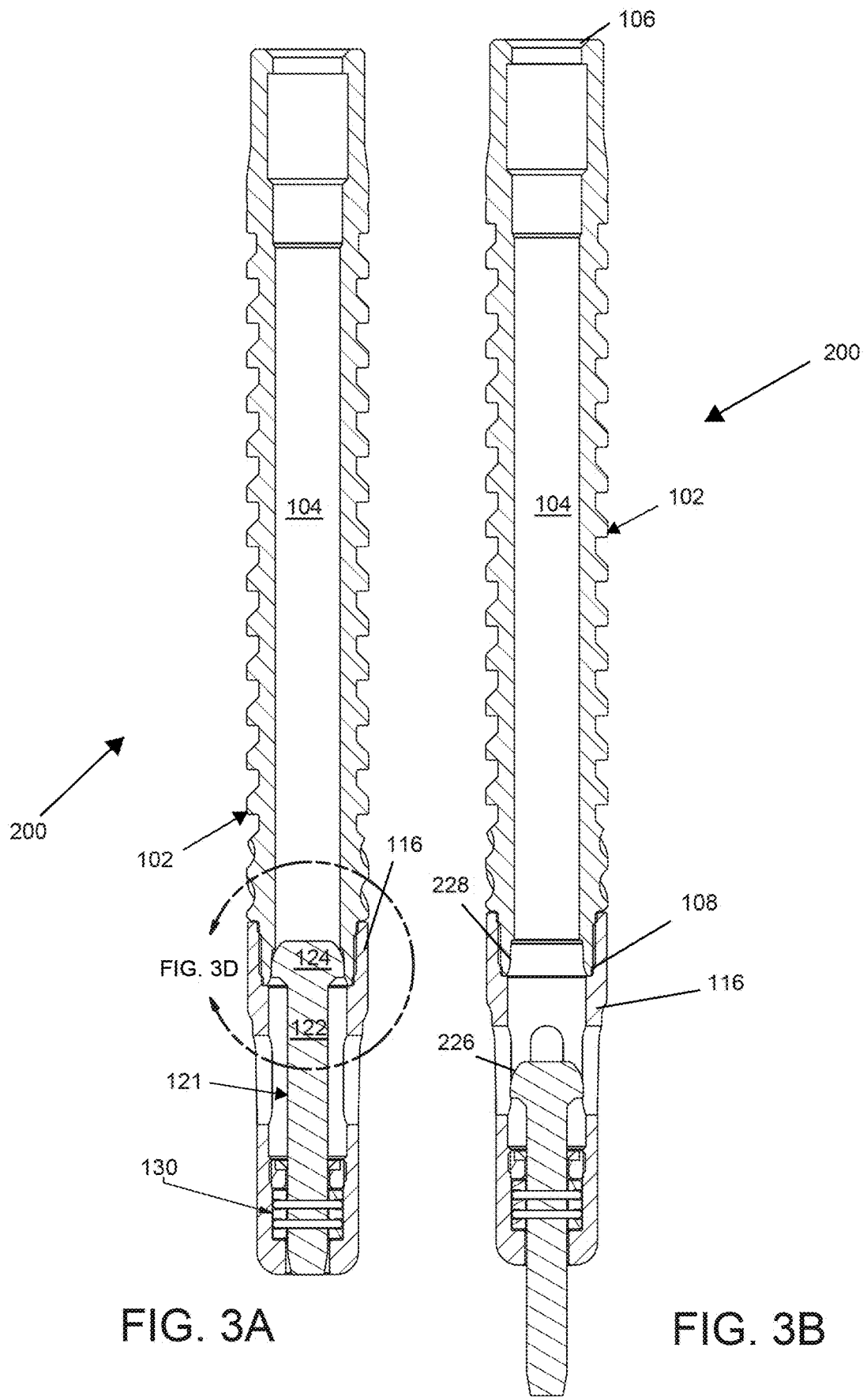
FIGS. 3A and 3B illustrate an alternate embodiment of a bypass plunger in closed and open configurations, respectively.

FIGS. 3A and 3B illustrate a taper-lock plunger 200 utilizing the locking tapered interface to lock a valve head (e.g., valve element) within a valve seat. As illustrated, the plunger 200 of FIGS. 3A and 3B is substantially identical to the plunger 100 of FIGS. 2A and 2B with the exception of the configuration of the valve face of the push rod 121 and the mating valve seat. Accordingly, like reference numbers are utilized to refer to like elements. Referring briefly to FIGS. 2B and 2C, it is noted that previous valve faces 126 are typically angled annular surfaces (e.g., frusto-conical surfaces) that engage a corresponding annular/conical valve seat 128. While these surfaces 126, 128 are configured to engage one another, they are not configured to lock together. By way of example, the prior valve seat 126 has an included angle α of approximately seventy degrees (70°). Likewise, the valve face 128 has a corresponding included angle of approximately one-hundred ten degrees (110°). While these surfaces are complementary, they do not provide a mechanical lock therebetween when forced together. In contrast, the valve seat 228 of the embodiment of FIGS. 3A and 3B has a surface that is tapered between about one-tenth a degree (0.1°) and about fifteen degrees (15.0°) relative to a centerline axis of the valve seat. More preferably, the valve seat surface is tapered between about one-tenth a degree (0.1°) and about ten degrees (10.0°). Yet more preferably, the valve seat surface is tapered between about one-tenth a degree (0.1°) and about five degrees (5.0°). Generally, it is believed that lower taper angles provide a better locking engagement. When the valve face 226 or the valve head (e.g., valve element) engages the taper-lock valve seat 228, the valve head 124 of the push rod 121 is mechanically locked within (e.g. wedged within) the valve seat 228.

Figure 3C:
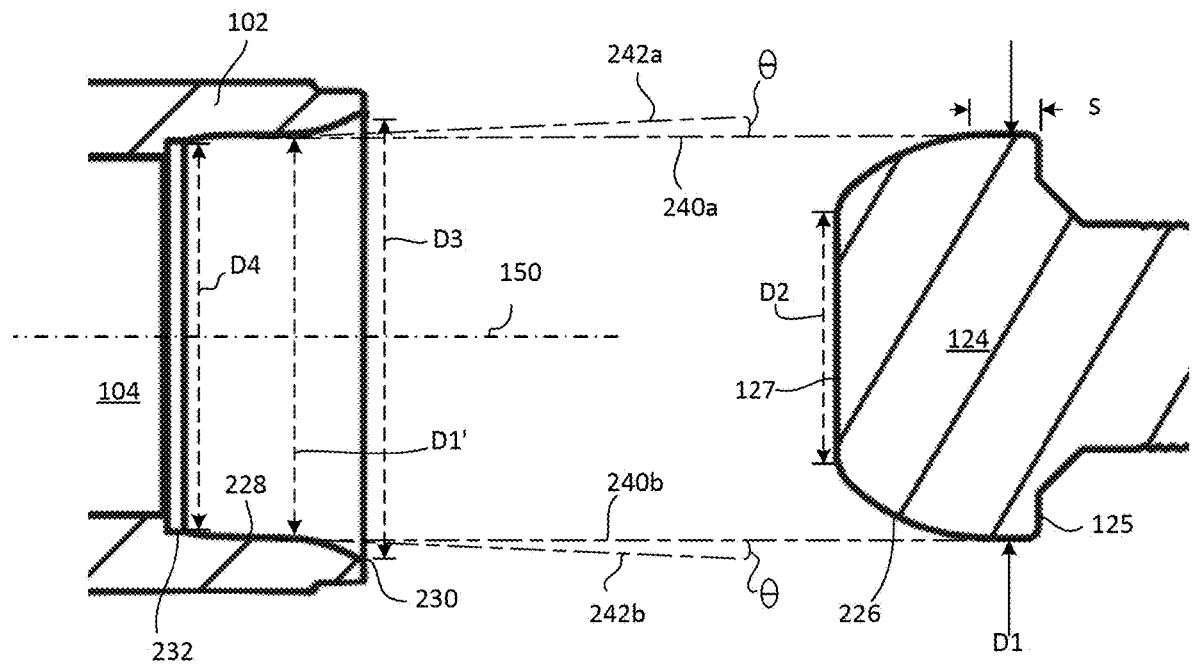
FIGS. 3C and 3D illustrate a valve head engaging a valve seat.
Figure 3D:
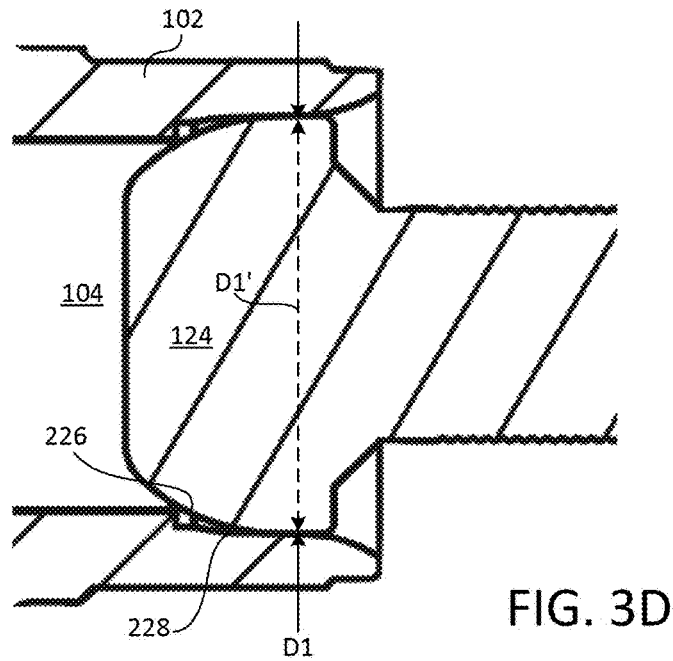

FIG. 3C and 3D illustrate the valve head 124, the valve face 226, the lower end of the plunger body 102 and the valve seat 228 of the taper-lock plunger 200. In the illustrated embodiment, the valve seat 228 is formed in the lower end of the plunger body 102. However, it will be appreciated that the valve seat may be formed in, for example, the valve cage 116 (See FIGS. 5A-5D) and that the presented embodiment is provided by way of example and not by way of limitation.

In the illustrated embodiment, the valve face 226 of the valve head 124 has a generally arcuate profile that extends from a maximum cross-dimension D1 (e.g., diameter) near its base end 125 to a smaller (e.g., minimum) cross-dimension D2 (e.g., diameter) at or near its upward end or tip 127. That is, the valve head 124 is a generally frusto-conical surface that tapers from a maximum cross-dimension to a minimum cross-dimension. Though the valve face 226 is illustrated as an arcuate surface, it will be appreciated that the valve face may be a linearly tapered surface. Further, when the valve face is an arcuate surface, the profile of this surface may vary (e.g., spherical, parabolic, etc.) and/or may vary non-uniformly over its length. What is important is that the cross-dimension of the face surface 226 reduces over its length between the maximum cross dimension D1 and the tip 127 of the valve head 124. In the present embodiment, the maximum cross dimension D1 extends along a portion of the length of the valve head 124 from its base 125 towards its tip 127 defining a skirt S having a constant cross-dimension. However, this is not a requirement.

The valve seat 228 is machined into the lower end of the plunger body 102 at the bottom of the fluid passage or flow path 104 extending through the plunger body. That is, the valve seat 228 is defined as a bore that is generally axially aligned with a centerline axis 150 of the flow path 104 of the plunger body 102. The valve seat 228 is a tapered annular (e.g., frusto-conical) surface that tapers from a maximum cross-dimension D3 at or near a bottom end 230 of the valve seat 228 to a smaller cross-dimension D4 at or near an upper end 232 of the valve seat 228. Along the length of the valve seat between the maximum cross-dimension D3 and the smaller cross-dimension D4, the valve seat has a cross dimension D1' that matches the maximum cross-dimension D1 of the valve head 124. As with the valve head, the valve seat 228 is illustrated as an arcuate surface. However, it will be appreciated that the valve seat may be a linearly tapered surface. Further, when the valve seat has an arcuate surface, the profile of this surface may vary (e.g., spherical, parabolic, etc.) and/or may vary non-uniformly over its length. What is important is that the cross-dimension of the seat surface 228 has an opening (e.g., D3) with a cross-dimension that is greater than the maximum cross-dimension of the valve head 124 to allow ready receipt of the valve head within the bore defined by the valve seat 228. Further, it is important that the valve seat reduce to a dimension that is smaller than the maximum cross dimension of the valve head such that a point of contact (e.g., annular contact line) exist between the valve face 226 and the valve seat 228. In the illustrated embodiment, this annular contact line exists at D1' when the valve head 124 is disposed within the valve seat 228. See FIG. 3D.

Of further importance for the taper-lock concept is that the angle of the surface of the valve seat 228 at the point of contact permits the valve face 226 to lock therein. In this regard, the valve seat 228 of the taper-lock plunger 200 has a tapered contact surface (e.g., at least at the contact point) where that the taper angle is between about one-tenth a degree (0.1°) and about fifteen degrees (15.0°) as measured from a centerline axis 150 of the plunger. This is illustrated in FIG. 3C which shows projection lines 240a and 240b projecting from the maximum cross-dimension D1 of the valve face 226/valve head 124 to the mating cross-dimension D1' within the valve seat 228. As shown, these projection lines 240a, 240b are parallel to one another as well as parallel to a centerline axis 150 of the taper lock plunger 200 and the valve seat bore. Projection lines 242a and 242b are projection lines originating from the contact point (e.g., D1') of the valve seat 228. In an embodiment where the valve seat 228 is an arcuate surface, these projection lines may be tangent lines. That is, these projection lines 242a, 242b may be straight lines that each touch the curved surface of the valve seat 228 at a single point (e.g., D1'), but if extended do not cross the curved surface of the valve seat at that point. In an embodiment, these tangent lines are perpendicular to a radius of the arcuate surface at the point of contact. In any embodiment, the projection lines show the taper angle Θ of the valve seat at the contact point. As shown, the taper angle Θ (e.g., contact angle) of the valve seat surface, as shown between the corresponding projection lines (e.g., 240a, 242a and 240b, 242b), is between about one-tenth a degree (0.1°)

and about fifteen degrees (15.0°) corresponding to an included angle of about two-tenths of a degree and about thirty degrees between opposing surfaces of the valve seat 228 (i.e., at the point of contact). In a particular embodiment, the taper angle Θ between the corresponding projection lines is two degrees. That is, each opposing surface has a one degree taper.

The small contact angle (e.g., taper angle) between the valve face and the valve seat permits the valve head 124 to wedge into the valve seat 228, upon contact, such that these elements lock together as illustrated in FIG. 3D. When engaged, the maximum outside diameter D1 of the valve head/valve face 226 is wedged into the valve seat 228 at or near the contact point D1' forming an annular seal there between Once engaged, these elements require the application of an external mechanical force (e.g., separator rod 17; See FIG. 1) to effect separation. Of note, variations are possible for the tapered surfaces of the valve seat and valve face. For instance, both surfaces may be a linearly tapered surface having identical taper angles or near identical taper angles so long at these tapered surfaces are between about one-tenth a degree (0.1°) and about fifteen degrees (15.0°). Further, when the surfaces are arcuate, it may be desirable to maintain the taper angle of the valve seat surface for a distance on either side of the contact point (e.g., above and below) to permit the valve face and valve seat to lock together. In an embodiment, the tapered surface of the valve seat is maintained at a taper angle (i.e., within the desired range) below and preferably above the contact point for a distance equal to at least 1/20 of the diameter of the valve seat at the contact point. In an embodiment, the tapered valve seat surface maintains the taper angle below and preferably above the contact point for a distance equal to at least 1/10 of the diameter of the valve seat at the contact. In a yet further arrangement, the taper angle may be maintained for a distance equal to at least ⅕ of the diameter of the valve seat at the contact point.

Figure 4A:
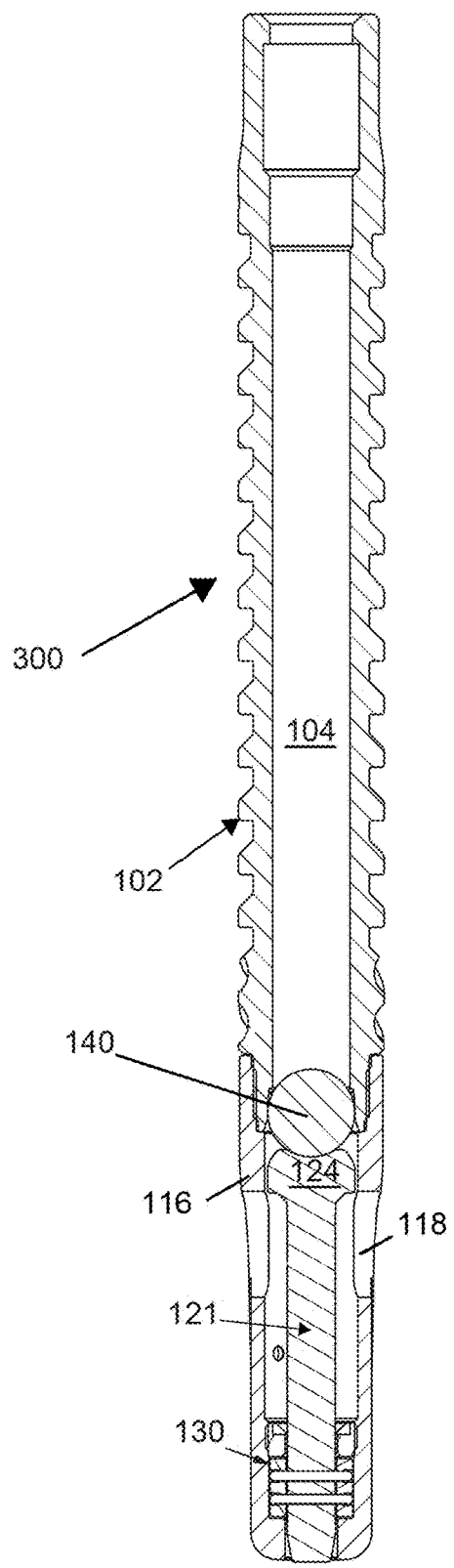
FIGS. 4A and 4B illustrate another embodiment of a bypass plunger in closed and open configurations, respectively.
Figure 4B:
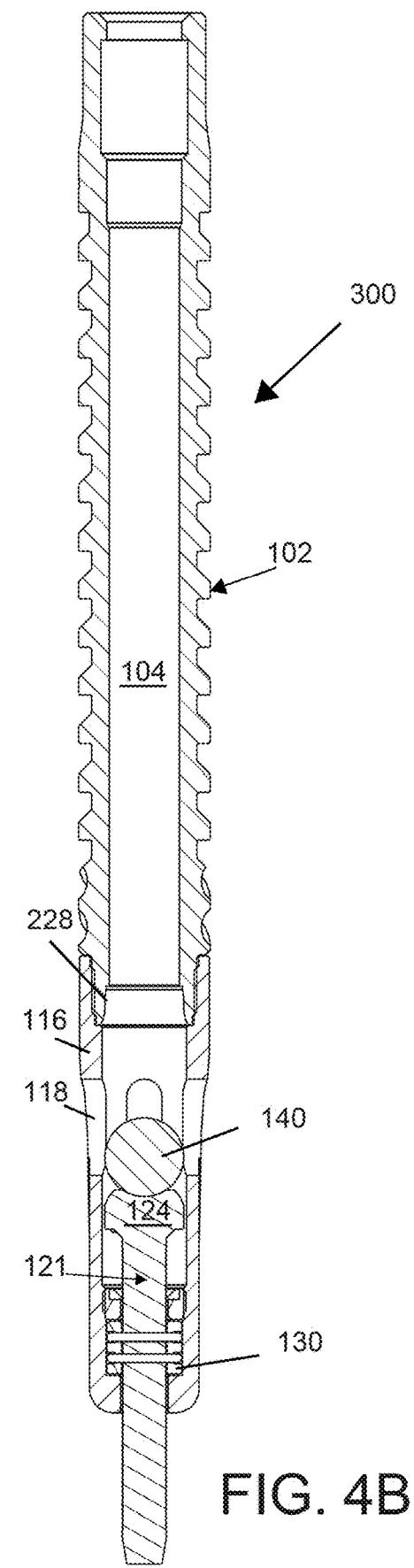

It will be appreciated that the taper-lock concept may be applied to differently configured bypass plungers. FIGS. 4A and 4B illustrate side cross-sectional views of another embodiment of a taper-lock plunger 300 in closed and open configurations, respectively. As illustrated, the plunger 300 of FIGS. 4A and 4B is substantially identical to the plunger 100 of FIGS. 2A and 2B with the exception of the inclusion of a shut-off ball/sphere 140 that is driven by the push rod 121 into the valve seat 228. Accordingly, like reference numbers are utilized to refer to like elements.

In the embodiment of FIGS. 4A and 4B, the shut-off ball 140 (e.g., valve element) is disposed within the valve cage 116 above the push rod 121. In such an arrangement, the push rod head 124 engages the lower end of the shut-off ball 140 and forces the shut-off ball into the valve seat 228 when the plunger arrives at the bottom of a well. Accordingly, the outside diameter of the shut-off ball 140 is sized for receipt along the interior length tapered valve seat 228. Again, the valve seat 228 has a taper angle between about one-tenth a degree (0.1°) and about fifteen degrees (15.0°) relative to a centerline axis of the valve seat/plunger body 102. A contact point along the length of the valve seat 228 has a diameter that is equal to the outside diameter (e.g., maximum diameter) of the shut-off ball 140. Again, these matching diameters at the contact point in conjunction with the tapering surface of the valve seat allows the shut-off ball to wedge within the valve seat closing fluid passage or flow path 104 through the bypass plunger 300. See FIG. 4A. The shut-off ball 140 is mechanically dislodged when the bypass plunger arrives at the surface opening the flow path 104 through the plunger 300. See FIG. 4B.

FIGS. 5A and 5B illustrate another embodiment of a lower end of a taper-lock plunger 250. This embodiment of the plunger uses the locking tapered interface to lock a valve head 124 (e.g., valve element) of a push rod 121 within a valve seat 228 of the plunger maintain the valve assembly in a closed position (See, FIG. 5B). This plunger 250 also uses a locking tapered interface to lock the valve head 124 in a valve seat 258 of the valve cage 116 to maintain the valve assembly in an open position (See, FIG. 5A). As illustrated, the lower end of the plunger 250 of FIGS. 5A and 5B shares numerous components as the plunger 100 of FIGS. 2A and 2B. Accordingly, like reference numbers are utilized to refer to like elements.

The valve seat 228 and the upper end of the valve head 124 are substantially similar or identical to these same elements as described in relation to FIGS. 3C and 3D. As best shown in FIG. 5D, the valve seat 228 is machined into the lower end of the plunger body 102 and is a tapered annular (e.g., frusto-conical) surface. Again, the valve seat 228 tapers from a maximum cross-dimension at or near its bottom end to a minimum cross-dimension at or near its upper end. Along the length of the valve seat between the maximum cross-dimension and the minimum cross-dimension, the valve seat has a cross dimension that matches a maximum cross-dimension of the valve head 124. When an upper valve face 226 of the valve head 124 (e.g., valve element) engages the tapered valve seat 228, the valve head 124 is mechanically locked within (e.g. wedged within) the valve seat 228. This closes the plunger 250 and allows gasses to push the plunger to the surface.

FIG. 5C illustrates the push rod 121 of the plunger 250. The push rod 121 includes a valve stem 122 and a valve head 124 (e.g., valve element) disposed at the upper end of the valve stem 122. The upper end of the valve head 124 includes the upper valve face 226 with a generally arcuate profile that is configured to engage the interior of the valve seat 228 in the plunger body. In addition, a lower end of the valve head 124 includes a lower valve face 236 with a generally arcuate profile that is configured to engage the interior of the valve seat 258 in the valve cage 116. Each valve face 226, 236 extends from a maximum cross-dimension (e.g., diameter) near the middle of the valve head 124 to a reduced cross dimension (e.g., diameter).

As shown in FIG. 5D, the valve cage 116 is disposed at the bottom end 108 of the plunger body 102. In the illustrated embodiment, an upper internal bore of the valve cage includes internal threads (not shown) that mate with external threads (not shown) formed on a lower outer surface of the plunger body 102. The flow path 104 through the plunger body 102 opens into a hollow interior of the valve cage 116 to enable the flow of fluid through the plunger 100 when the valve 120 is open and the plunger is descending through production tubing. The valve cage 116 includes a plurality of openings 118 in its sidewall to permit the passage of fluids through the bypass plunger 100 when the valve assembly is open (See, e.g., FIG. 5A). When assembled, the pushrod 121 is disposed within an interior of the valve cage 116 such that the valve stem 122 extends from the valve head 124 through an interior of the valve cage 116 and through an aperture 117 in the bottom end of the valve cage 116. See FIG. 5A.

Referring again to FIG. 5D, an upper end of the aperture 117 through the bottom of the valve cage 116 includes a valve seat 258 that is configured to receive the lower valve face lower valve face 236 of the valve head 124. The cage valve seat 258 tapers from a maximum cross-dimension at or near its upper end to a smaller cross-dimension at or near a bottom end of the cage valve seat. Along the length of the cage valve seat between the maximum cross-dimension and the smaller cross-dimension, the valve seat has a cross dimension that matches a maximum cross-dimension of the valve head 124. As shown, a taper angle Θ (e.g., contact angle) of the valve seat 258, as shown between projection lines, is between about one-tenth a degree (0.1°) and about fifteen degrees(15.0°) corresponding to an included angle of about two-tenths of a degree and about thirty degrees between opposing surfaces of the valve seat 258 (i.e., at the point of contact). When a lower valve face 236 of the valve head 124 (e.g., valve element) engages the tapered cage valve seat 258, the valve head 124 is mechanically locked within (e.g. wedged within) the cage valve seat 258. This locks the valve assembly in the open position (See, e.g., FIG. 5A) without the use of a separate clutch assembly. Likewise, the valve stem may be free of the ridges and grooves described above.

The engagement of the lower valve face with the cage valve seat 236 maintains the valve assembly in an open position while the plunger 250 descends in a well (e.g., descends in production tubing). In such a configuration, the plunger 250 may descend though production tubing until the lower end of the stem 121 engages the seating nipple/tubing stop or other structure at the bottom of the well. Contacting the seating nipple or other structure at the bottom of the well forces the push rod 121 upward in the cage 116 driving the lower valve face 236 out of the cage valve seat 258. That is, this impact provides the mechanical force necessary to disengage the valve head from the cage valve seat.

Figure 6A:
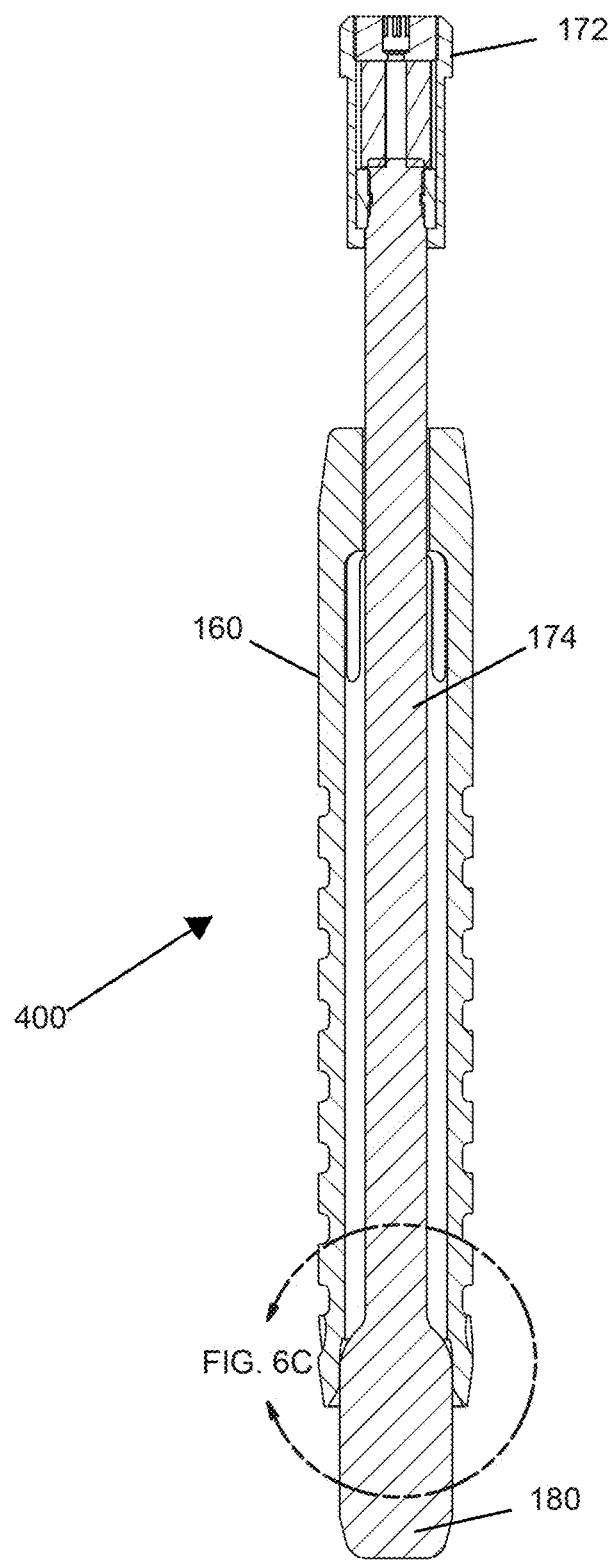
FIGS. 6A and 6B illustrate another embodiment of a bypass plunger in closed and open configurations, respectively.
Figure 6B:
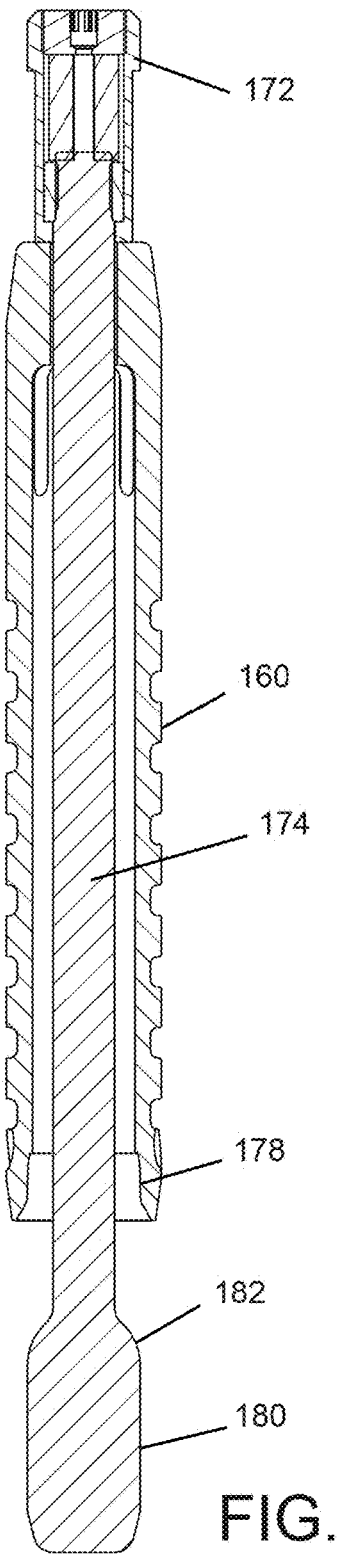

FIGS. 6A and 6B illustrate side cross-sectional views of a slidable sleeve bypass plunger 400 in a closed configuration and in an open configuration, respectively. The illustrated slidable sleeve bypass plunger 400 incorporates a version of taper lock concept. The bypass plunger 300 includes a generally cylindrical sleeve 160 having a hollow interior/flow path. A mandrel 170 passes through the hollow interior of the sleeve 160. The mandrel 170 includes a top end element 172, a bottom end element 180 (e.g., valve element) and a shaft 174 extending between the top bottom end element. The top end element 172 and bottom end element 180 each have a cross-dimension or diameter that is greater than the diameter of the flow path through the plunger sleeve 160. When assembled, the top end and bottom end are connected by the shaft 174 which is disposed through the sleeve 160. That is, the mandrel shaft 174 and the sleeve 160 are coaxially disposed such that the mandrel shaft 174 is movable in an axial direction relative the sleeve 160 and vice versa. As shown, the shaft 174 is longer than the sleeve 160 permitting the sleeve to move between the top end 172 of the mandrel and the bottom end 180 of the mandrel. When the mandrel is in a closed position (See., FIG. 6A), the bottom end 180 of the mandrel 170 is received within a valve seat 178 in the lower end of the sleeve 160, which prevents fluid from entering the plunger 300. In this regard, the outside surface of the bottom end 180 of the mandrel forms a valve face 182. In the closed position, bypass plunger 400 may ascend and carry any loading fluid to the surface, removing fluids residing above plunger 400 from production tubing. When the top end 172 of the mandrel 170 strikes the top of the well (e.g., within a lubricator), the impact of the strike forces the sleeve 160 into an open position as shown in FIG. 6B. This opens a flow path through the bypass plunger 400 allowing the plunger to descend into a well. When the bottom end 180 strikes the well bottom, the impact stops the mandrel allowing the sleeve 170 to move downward such that the mandrel bottom end 180 is received within the valve seat 178 in the bottom end of the sleeve 170 thereby closing the bypass plunger 400. A complete description of such a plunger 400 is provided in U.S. Pat. No. 7,314,080, the entirety of which is incorporated herein by reference.

Figure 6C:
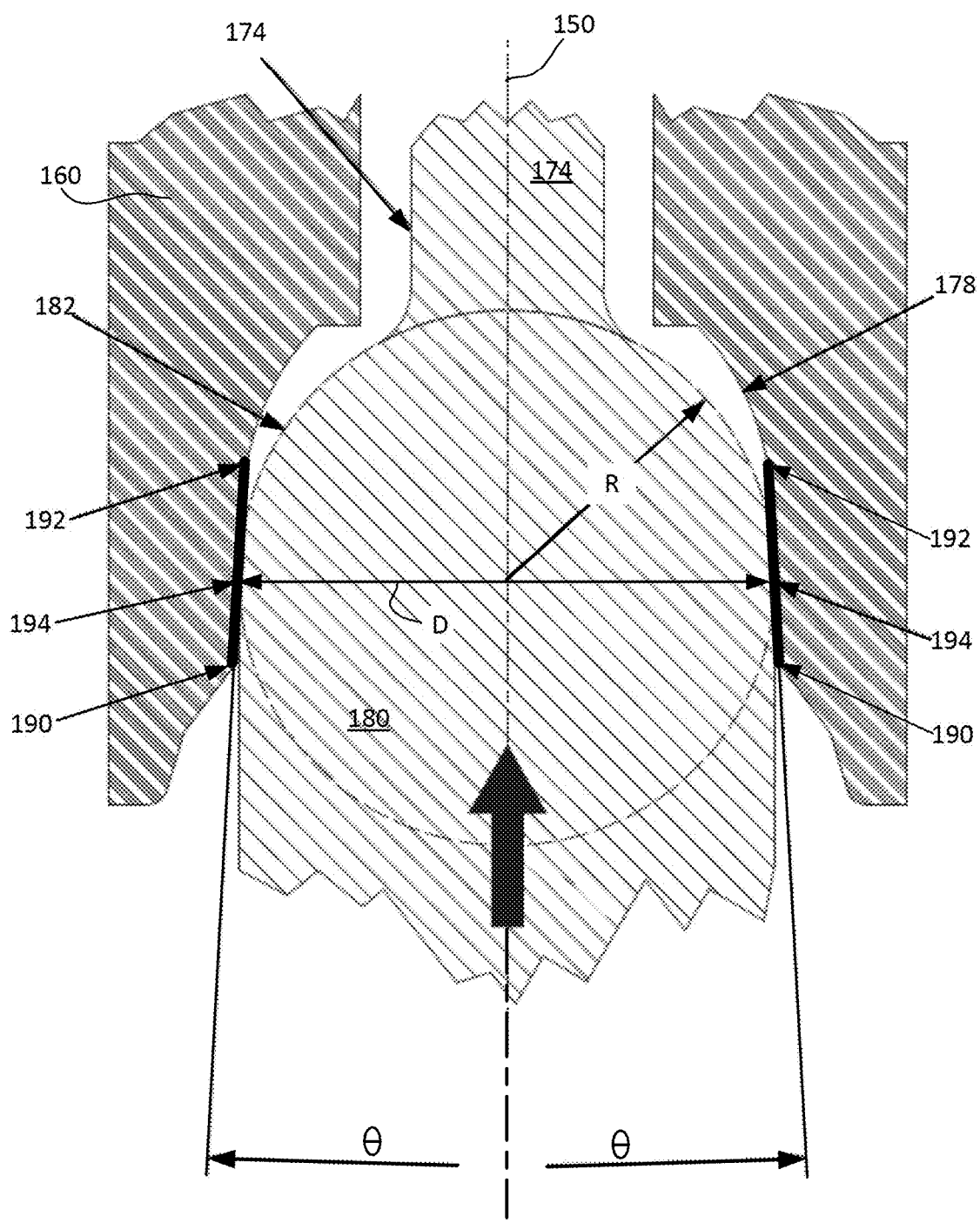
FIG. 6C illustrate the valve element of the plunger of FIGS. 5A and 5B engaging a valve seat.

FIG. 6C illustrates the mandrel bottom end 180 as disposed within the valve seat 178 as formed in the lower end of the plunger sleeve 160. As with the previous embodiments, the valve seat tapers from its bottom end 190 to an upper portion 192 with a taper angle Θ of between about one-tenth a degree (0.1°) and about fifteen degrees (15.0°) relative to a centerline axis 150 of the valve seat 178. Along the length of the valve seat surface between the bottom end 190 and the upper portion 192 is a contact point 194 that has an equal cross-dimension (e.g., diameter) as the maximum cross-dimension D of the portion of the mandrel bottom end 180 that is configured to fit within the valve seat bore. As previously noted, it may be desirable that the valve seat surface maintain the taper angle Θ (e.g. 0.1°-15.0°) a distance above and below the contact point 194 to ensure that the valve face 182 of the mandrel bottom end 180 can effectively wedge into the valve seat 178. This is illustrated in FIG. 5C by the shaded lines extending between the bottom end 190 and upper portion 192 of the valve seat 178. In the present embodiment, the valve seat surface maintains the taper angle Θ for a distance of approximately one-sixth of the diameter of the valve seat (i.e., at the contact point 194) above and below the contact point.

The use of the small taper angle of the valve seat (i.e., taper-lock concept) is set forth above in relation to three illustrated bypass plunger embodiments. However, it should be appreciated that numerous additional configurations of prior art bypass plungers are known and that the taper-lock concept may be incorporated into various ones of these prior art bypass plungers. No limitation should be inferred.

The foregoing description has been presented for purposes of illustration and description. Furthermore, the description is not intended to limit the inventions and/or aspects of the inventions to the forms disclosed herein. Consequently, variations and modifications commensurate with the above teachings, and skill and knowledge of the relevant art, are within the scope of the presented inventions. The embodiments described hereinabove are further intended to explain best modes known of practicing the inventions and to enable others skilled in the art to utilize the inventions in such, or other embodiments and with various modifications required by the particular application(s) or use(s) of the presented inventions. It is intended that the appended claims be construed to include alternative embodiments to the extent permitted by the prior art.

What is claimed is:

1. A bypass plunger for use in a hydrocarbon well, comprising:
   a generally cylindrical body having a fluid flow path extending axially through at least a portion of the cylindrical body along a centerline axis of the cylindrical body;
   a valve seat formed proximate to a bottom of the the fluid flow path, the valve seat having a annular sidewall surface disposed at a taper angle relative to the centerline axis, wherein the taper angle is between one-tenth of a degree and fifteen degrees;
   a valve cage attached to a bottom end of the cylindrical body;

a push rod disposed in the valve cage, the push rod movable between an open position spaced from the valve seat to permit fluid flow through the fluid flow path and a closed position to block fluid flow through the fluid flow path, the push rod having:
a valve head having a valve face on an upper surface that is arcuate in profile and tapers from a maximum valve head diameter to a smaller valve head diameter at a tip of the valve head;
wherein the annular sidewall of the valve seat tapers from an larger valve seat diameter at the bottom of the valve seat to a smaller valve seat diameter at an upper portion of the valve seat, wherein the larger valve seat diameter is greater than the maximum valve head diameter and the smaller valve seat diameter is smaller than the maximum valve head diameter; and
where the maximum valve head diameter of the valve head engages an interior of the valve seat about an annular contact line in the closed position mechanically engaging the push rod with the valve seat.

2. The bypass plunger of claim 1, wherein the taper angle is less than five degrees.

3. The bypass plunger of claim 1, wherein the valve element comprises a push rod, wherein the valve face is an upper valve face disposed on an upper portion of the push rod.

4. The bypass plunger of claim 1, further comprising:
a lower valve face disposed on a lower portion of the valve head; and
a cage valve seat formed in the valve cage, the cage valve seat having a annular sidewall surface disposed at a taper angle relative to the centerline axis, wherein the taper angle is between one-tenth of a degree and fifteen degrees.

5. The bypass plunger of claim 4, wherein the lower valve face is at least partially disposed within and mechanically engaged with the cage valve seat when the valve element is in the open position.

6. The bypass plunger of claim 1, wherein an end of the push rod extends through an aperture in a lower end of the valve cage.

7. The bypass plunger of claim 1, further comprising a clutch disposed in the valve cage, wherein the push rod extends through the clutch, wherein the clutch provides frictional resistance to movement of the push rod.

8. A method for use in a production well, comprising:
permitting a plunger to descend in a well until the plunger hits a structure proximate to a bottom of the well;
upon the plunger contacting the structure, driving a valve element into an valve seat wherein the valve seat has an annular sidewall surface disposed at a taper angle relative to a centerline axis of the plunger, wherein the taper angle is between one-tenth of a degree and fifteen degrees, wherein an upper valve face of the valve element wedges into the valve seat mechanically locking the valve element in the valve seat and closing a flow path through the plunger;
permitting the plunger to ascend in the well until the plunger hits a well head structure mechanically disengaging the valve element from the valve seat and opening the flow path through the plunger and;
driving a rod through at least a portion of the plunger in the well head structure to dislodge the valve element from the valve seat; and
in conjunction with mechanically disengaging the valve element from the valve seat, driving a lower valve face of the valve element into a second valve seat mechanically locking the valve element in the second valve seat an opening the flow path through the plunger.

9. A bypass plunger for use in a hydrocarbon well, comprising:
a generally cylindrical body having a fluid flow path extending axially through at least a portion of the cylindrical body along a centerline axis of the cylindrical body;
a first valve seat formed proximate to a bottom of the fluid flow path, the first valve seat having a annular sidewall surface disposed at a taper angle relative to the centerline axis, wherein the taper angle is between one-tenth of a degree and fifteen degrees and wherein a cross dimension of at an inlet end of the first valve seat is greater than a cross dimension of the fluid flow path;
a valve cage attached to a bottom end of the cylindrical body the valve cage having a second valve seat formed in the valve cage, the second valve seat having a annular sidewall surface disposed at a taper angle relative to the centerline axis, wherein the taper angle is between one-tenth of a degree and fifteen degrees;
a push rod disposed in the valve cage, the push rod movable between an open position spaced from the first valve seat to permit fluid flow through the fluid flow path and a closed position, wherein in the closed position an upper valve face of the push rod is at least partially disposed within and mechanically engaged with the first valve seat to block fluid flow through the fluid flow path and wherein in the open position a lower valve face of the push rod is at least partially disposed within and mechanically engaged with the second valve seat.

10. The bypass plunger of claim 9, wherein the upper valve face and the first valve seat collectively define a self-holding machine taper.

* * * * *